(12) United States Patent
Liu et al.

(10) Patent No.: US 8,649,635 B2
(45) Date of Patent: Feb. 11, 2014

(54) IMAGE SCALING METHOD AND APPARATUS

(75) Inventors: Yuan Liu, Shenzhen (CN); Jing Wang, Shenzhen (CN); Honghong Su, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 179 days.

(21) Appl. No.: 13/073,695

(22) Filed: Mar. 28, 2011

(65) Prior Publication Data

US 2011/0170802 A1    Jul. 14, 2011

Related U.S. Application Data

(63) Continuation of application No. PCT/CN2009/072093, filed on Jun. 2, 2009.

(30) Foreign Application Priority Data

Sep. 28, 2008  (CN) .............................. 200810169225

(51) Int. Cl.
*G06K 9/32* (2006.01)
(52) U.S. Cl.
USPC ........................................................ 382/298
(58) Field of Classification Search
USPC ........................................................ 382/298
See application file for complete search history.

(56) References Cited

U.S. PATENT DOCUMENTS

| | | | | |
|---|---|---|---|---|
| 5,436,669 A | * | 7/1995 | Baba et al. ..................... | 348/556 |
| 5,920,659 A | * | 7/1999 | Iverson et al. ................. | 382/298 |
| 6,333,997 B1 | * | 12/2001 | Hashiya et al. ............... | 382/201 |
| 6,766,055 B2 | * | 7/2004 | Matsugu et al. .............. | 382/173 |
| 6,775,411 B2 | * | 8/2004 | Sloan et al. ................... | 382/224 |
| 7,158,158 B1 | * | 1/2007 | Fleming et al. ............... | 345/698 |
| 8,149,248 B2 | * | 4/2012 | Ko et al. ........................ | 345/660 |
| 8,160,398 B1 | * | 4/2012 | Avidan et al. ................. | 382/298 |
| 2001/0046310 A1 | * | 11/2001 | Shima ........................... | 382/107 |
| 2003/0198399 A1 | * | 10/2003 | Atkins ........................... | 382/261 |
| 2004/0005081 A1 | * | 1/2004 | Arcas-Luque et al. ....... | 382/101 |

(Continued)

FOREIGN PATENT DOCUMENTS

| | | |
|---|---|---|
| CN | 1685715 A | 10/2005 |
| CN | 1894957 A | 1/2007 |

(Continued)

OTHER PUBLICATIONS

Chen, L-Q., et al., "A visual attention model for adapting images on small displays," Multimedia Systems 9: 353-364 (2003), 2003, pp. 353-364, Springer-Verlag.

(Continued)

*Primary Examiner* — Gandhi Thirugnanam
(74) *Attorney, Agent, or Firm* — Slater & Matsil, L.L.P.

(57) ABSTRACT

The present invention relates to image processing technologies, and discloses an image scaling method and apparatus to reduce distortion of a scaled image. The image scaling method includes: determining a distribution direction of main objects in a source image; and scaling the source image to a target image through a nonlinear scaling method according to the distribution direction of the main objects in the source image, where the nonlinear scaling method employs a scaling direction vertical to the distribution direction of the main objects in the source image. The embodiments of the present invention are primarily applicable to the image scaling field.

10 Claims, 5 Drawing Sheets

(56) References Cited

U.S. PATENT DOCUMENTS

| | | | |
|---|---|---|---|
| 2005/0099541 A1* | 5/2005 | Bennett et al. | 348/556 |
| 2005/0190202 A1* | 9/2005 | Suzuki et al. | 345/660 |
| 2007/0076020 A1* | 4/2007 | Fleming et al. | 345/698 |
| 2007/0092162 A1* | 4/2007 | Keithley et al. | 382/298 |
| 2007/0098302 A1* | 5/2007 | Yamamoto | 382/300 |
| 2007/0195194 A1* | 8/2007 | Op De Beeck | 348/445 |
| 2009/0190857 A1* | 7/2009 | Epshtein et al. | 382/276 |
| 2011/0170802 A1* | 7/2011 | Liu et al. | 382/298 |
| 2011/0182502 A1* | 7/2011 | Liang | 382/162 |
| 2011/0262055 A1* | 10/2011 | De Haan et al. | 382/298 |

FOREIGN PATENT DOCUMENTS

| | | |
|---|---|---|
| CN | 1967654 A | 5/2007 |
| CN | 1997113 A | 7/2007 |
| CN | 101197957 A | 6/2008 |
| CN | 101365077 A | 2/2009 |
| DE | 19717140 A1 | 10/1998 |
| WO | WO 2005/060243 A1 | 6/2005 |
| WO | WO 2010/034202 A1 | 4/2010 |

OTHER PUBLICATIONS

Setlur, V., et al., "Retargeting Images and Video for Preserving Information Saliency," IEEE Computer Society, Sep./Oct. 2007, pp. 80-88, IEEE.

Written Opinion of the International Searching Authority, PCT Application No. PCT/CN2009/072093, Applicant: Shenzhen Huawei Communications Technologies Co., Ltd., et al., Mailing date: Sep. 10, 2009, 5 pages.

Second Chinese Office Action, Chinese Application No. 200810169225.4, Dated: Aug. 1, 2011, 10 pages.

Extended European Search Report, European Application No. 09815572.4-1241 / 2334058, Applicant: Huawei Device Co., Ltd., Dated: Aug. 1, 2011, 8 pages.

* cited by examiner

IMAGE SCALING METHOD AND APPARATUS

This application is a continuation of co-pending International Application No. PCT/CN2009/072093, filed Jun. 2, 2009, which designated the United States and was not published in English, and which claims priority to Chinese Application No. 200810169225.4, filed Sep. 28, 2008, both of which applications are incorporated herein by reference.

TECHNICAL FIELD

The present invention relates to image processing technologies, and in particular, to an image scaling method and apparatus.

BACKGROUND

Image scaling is a common image processing technology, and the scaling is rather difficult if the source image and the target image have different aspect ratios. With the aspect ratios being different, distortion occurs when the source image is scaled up or down to the target image, especially when the aspect ratio of the source image is sharply different from that of the target image.

A typical scenario of image scaling is the adaptation between an image with a 4:3 aspect ratio and an image with a 16:9 aspect ratio. Currently, the video communication system needs to be compatible with both the standard-definition image (such as 4CIF) with the existing aspect ratio of 4:3 and the high-definition image (such as 720p and 1080p) with a new aspect ratio of 16:9. The traditional Cathode Ray Tube (CRT) television sets generally employ an aspect ratio of 4:3, and the latest high-definition Liquid Crystal Display (LCD) television sets generally employ an aspect ratio of 16:9. Therefore, there is a problem as regards how to scale a standard-definition video image with an aspect ratio of 4:3 to an image presentable on a high-definition television set with an aspect ratio of 16:9, and vice versa.

The prior art puts forward many solutions to the foregoing problem to implement scaling between images with different aspect ratios, for example, linear scaling, edge trimming, horizontal nonlinear scaling, and filling of black edges of images. However, in the process of implementing the present invention, the inventor finds at least the following problems in the prior art.

When images are scaled through linear scaling, the method is simple, but distortion of images is serious. When images are scaled through edge trimming, the distortion of images is avoided, but the main objects of the images are vulnerable to loss. When the black edge of an image is filled in the scaling process, the scaled image is smaller than the source image, and it is impossible to fill the whole display area. The filling of the black edge leads to interference to the audience. When an image is scaled through a horizontal nonlinear scaling algorithm, if the main objects in the image are in the middle of the image, the main object area is little distorted after the scaling, and the visual effect is good; however, if the main objects (such as persons) exist on the edge of the image, the persons at the edge are distorted sharply against the persons in the middle of the image after the image scaling, and the visual effect is deteriorated. Meanwhile, if objects are moving horizontally, for example, captions which scroll horizontally or persons who walk horizontally, the captions or persons crossing areas are distorted sharply, and the audience is sensitive to such distortion.

SUMMARY OF THE INVENTION

The embodiments of the present invention provide an image scaling method and apparatus to reduce distortion of a scaled image.

To fulfill such objectives, the embodiments of the present invention are based on the following technical solution.

An image scaling method includes: determining a distribution direction of main objects in a source image; and scaling the source image to a target image through a nonlinear scaling method according to the distribution direction of the main objects in the source image, where the nonlinear scaling method employs a scaling direction vertical to the distribution direction of the main objects in the source image.

An image scaling apparatus includes: a distribution direction determining unit, adapted to determine a distribution direction of main objects in a source image; and an image scaling unit, adapted to scale the source image to a target image through a nonlinear scaling method according to the distribution direction of the main objects in the source image, where the nonlinear scaling method employs a scaling direction vertical to the distribution direction of the main objects in the source image.

Through the image scaling method and apparatus under the present invention, the distribution direction of the main objects in the source image is determined, and the source image is scaled to the target image through a proper nonlinear scaling method according to the distribution direction of the main objects in the source image. Therefore, the method and apparatus under the present invention prevent distortion of the target image in the important area to which human eyes are sensitive, and reduce the distortion of the scaled image.

BRIEF DESCRIPTION OF THE DRAWINGS

To describe the technical solution under the present invention more clearly, the following outlines the accompanying drawings involved in the embodiments of the present invention. Apparently, the accompanying drawings outlined below are not exhaustive, and persons of ordinary skill in the art can derive other drawings from such accompanying drawings without any creative effort.

DETAILED DESCRIPTION OF ILLUSTRATIVE EMBODIMENTS

The present invention is hereinafter described in detail with reference to exemplary embodiments and accompanying drawings. To describe the technical solution under the present invention more clearly, the following outlines the accompanying drawings involved in the embodiments of the present invention. Apparently, the accompanying drawings outlined below are not exhaustive, and persons of ordinary skill in the art can derive other drawings from such accompanying drawings without any creative effort.

First Embodiment

Figure 1:
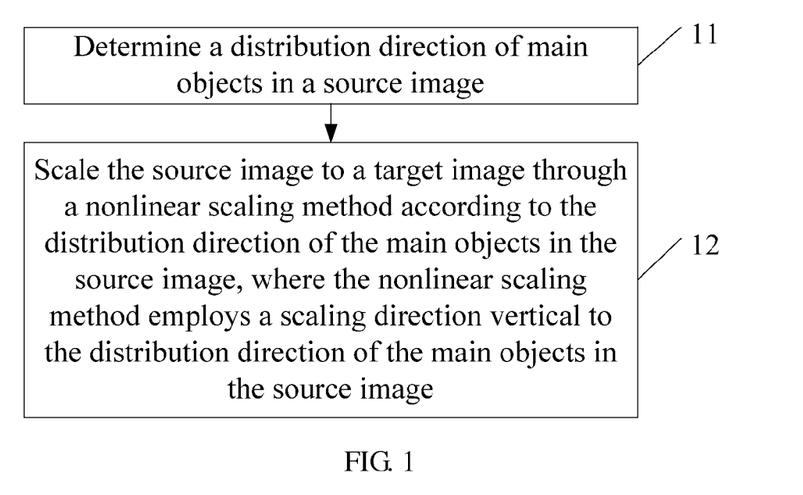
FIG. 1 is a flowchart of an image scaling method provided in a first embodiment of the present invention.

To reduce distortion of a scaled image, this embodiment puts forward an image scaling method. As shown in FIG. 1, the image scaling method in this embodiment includes the following steps.

Step 11: Determine the distribution direction of the main objects in a source image.

The distribution direction of the main objects in the source image may be determined by detecting the source image. The distribution direction of the main objects in the source image may be characterized by great symmetry, or even distribution, or rich textures.

The source image may be detected through face detection method, edge detection method, or entropy coding method. Taking the face detection method as an example, it is regarded that the persons in the scene are the main objects. Therefore, before scaling of the image, the distribution of the faces of persons is detected in the image, and the distribution direction of the persons and the symmetry information are obtained as a basis for deciding the scaling direction. The face detection method may be performed through a mature algorithm currently available. In an edge detection method, it is regarded that human eyes are sensitive to the area with rich textures (main objects) but not sensitive to the flat area with few textures (trivial objects). Therefore, the edge detection algorithm such as Sobel and Laplacian can be used to calculate the edge distribution of the scene, and determine the distribution of the main objects of the scene. Alternatively, through an entropy coding method, the direction with even distribution of the main objects is detected in the source image, and the distribution of the main objects in the scene is determined.

Alternatively, the direction of the main objects in the image may be preset to decide whether to employ a horizontal nonlinear scaling method or to employ a vertical nonlinear scaling method, or to employ other methods.

Step 12: Scale the source image to a target image through a nonlinear scaling method according to the distribution direction of the main objects in the source image, where the nonlinear scaling method employs a scaling direction vertical to the distribution direction of the main objects in the source image.

An image may be scaled in the horizontal direction or the vertical direction, whichever makes the scaling direction of the image vertical to the distribution direction of the main objects. For example, when the main objects in the image are distributed vertically, the image is scaled according to the horizontal nonlinear scaling method in the prior art. When the main objects in the image are distributed horizontally, the image is scaled according to a vertical nonlinear scaling method.

Through the image scaling method in the first embodiment, the distribution direction of the main objects in the source image is determined through detection of the image content, and the source image is scaled to the target image through a proper nonlinear scaling method according to the distribution direction of the main objects in the source image. Therefore, the method provided in this embodiment avoids distortion of the target image in the important area to which human eyes are sensitive, and reduces the distortion of the scaled image.

In the image scaling process detailed below, the vertical nonlinear scaling method is taken as an example.

Second Embodiment

Figure 2:
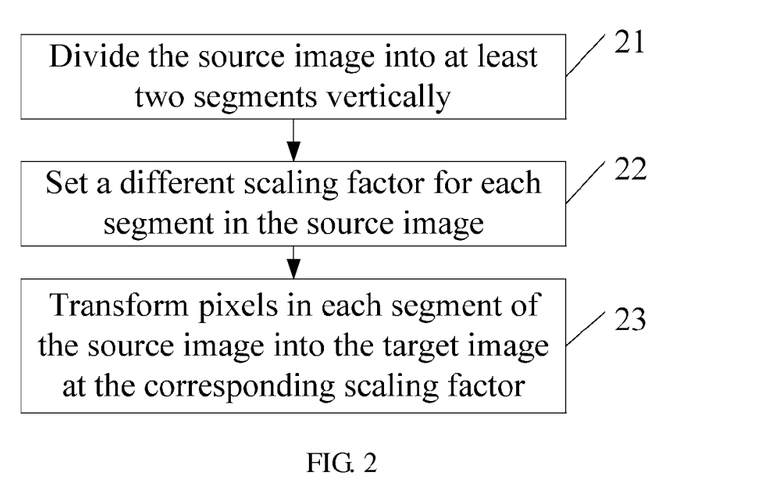
FIG. 2 is a flowchart of an image scaling method which applies a vertical nonlinear scaling method in a second embodiment of the present invention.

As shown in FIG. 2, an image scaling method which applies a vertical nonlinear scaling method in the second embodiment includes the following steps.

Step 21: Divide the source image into at least two segments in the scaling direction. Specifically, with respect to vertical nonlinear scaling, this step is to divide the source image into at least two segments in the vertical direction.

Generally, the main objects such as persons or things in the scene are distributed horizontally. The persons or things which change positions in a wide scope move horizontally, for example, persons who walk in the scene. In the vertical direction of the image, few main objects are distributed and contents change scarcely, and the symmetrical distribution of the image contents in the horizontal direction is much more than the symmetrical distribution of the image contents in the vertical direction. The nonlinear scaling method in the prior art scales the image in the horizontal direction, which generates obvious distortion in the horizontal direction. The vertical nonlinear scaling is better.

In the prior art, the horizontal nonlinear scaling method is almost symmetrical. To obtain a better effect of image scaling, this embodiment uses an asymmetrical scaling method to scale an image on the basis of vertical nonlinear scaling. In general scenes, the contents distributed vertically are of different importance. For example, in an indoor scene, persons and important things are generally centralized in the middle and lower part of the image, and trivial objects are generally distributed in the upper part of the image. The audience is generally sensitive to the main objects, which should be protected from distortion in the scaling process. The upper part of the image is generally unimportant, and allows more distortion.

Based on the foregoing principles, in the method provided in the second embodiment, the source image is divided into at least two segments in the vertical direction. In the segmenting process, the height of each segment may be specified as required, or determined according to the percentage of the height of each segment to the total height of the source image. Moreover, all segments may have the same height or not. For example, supposing that the aspect ratio of the source image is 4:3, the source image may be divided into an upper segment, a middle segment and a lower segment. The heights of the segments may be 30%, 50%, and 20% of the total height of the source image respectively.

Step 22: Set a different scaling factor for each segment in the source image.

In practice, the scaling factor may be set for the segment of the main objects and the segment of the trivial objects respectively in the source image. For the segment that includes more main objects in the source image, the scaling factor may be smaller; for the segment that includes fewer main objects in the source image, the scaling factor may be larger. The scaling factor is set manually or empirically.

It is assumed that the source image is divided into three segments in step 21. In the source image, the middle segment and the lower segment include a majority of the main objects, and the upper segment includes a minority of the main objects. Therefore, to prevent the important area critical to human eyes from distortion, the scaling factor of the middle segment and the lower segment is set to 1, and the scaling factor of the upper segment is set to 0.5. In an extreme circumstance, every pixel in the source image is regarded as a segment, and a different scaling factor is set for every pixel.

Step 23: Transform pixels in each segment of the source image into the target image at the corresponding scaling factor.

In the transformation process, the pixels of the source image are mapped to the pixels of the target image. In this way, valid image data can be selected for the target image. In practice, when a reverse mapping method is applied to the transformation process, in the corresponding segment of the source image, one or more corresponding source pixels are found for each target pixel in the target image, and then the coordinate position and the value of the target pixel are determined in the source image according to the coordinate position and the value of one or more source pixels. In practice, a differential filtering algorithm such as bilinear differential filtering algorithm and cubic convolution interpolation algorithm may be used to calculate the value of the target pixel.

In the image scaling method in the second embodiment, the image is scaled through asymmetrical scaling on the basis of vertical nonlinear scaling. Therefore, the method provided in the second embodiment prevents the important area critical to human eyes from distortion in the target image, reduces the distortion caused in the scaling process, and achieves a better scaling effect of the image.

Third Embodiment

Figure 3:
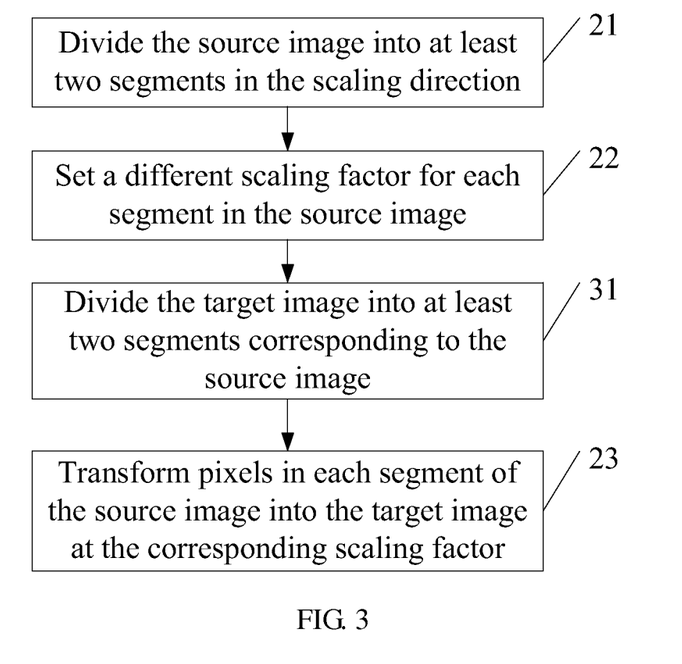
FIG. 3 is a flowchart of an image scaling method which applies a vertical nonlinear scaling method in a third embodiment of the present invention.

To improve efficiency and accuracy of image scaling, the third embodiment adds more steps after step 22 of the second embodiment, as shown in FIG. 3.

Step 31: Divide the source image into at least two segments, and then divide the target image accordingly. At the time of segmenting the source image, the width and the height of the target image may be calculated out according to the source image. The target image can be segmented in the same way as segmenting the source image. For example, the source image is divided into an upper segment, a middle segment, and a lower segment, and the heights of the segments are 30%, 50%, and 20% of the total height of the source image respectively; therefore, the target image can be divided into three segments according to the height of the target image, and the heights of the segments are 20%, 60%, and 20% of the total height of the target image respectively.

In the vertical nonlinear image scaling method provided in the second and third embodiments above, because the main objects of an image are generally distributed in the middle part and the lower part of the image, the source image is divided into at least two segments in the vertical direction, and a different scaling factor is set for each segment, and then the source image is transformed into the target image at the scaling factors. Because the segmenting mode and the scaling factor of each segment are determined according to the distribution of main objects in the image, the methods provided in the second embodiment and the third embodiment avoid distortion of the target image in the important area to which human eyes are sensitive, and reduce the distortion caused in the scaling process.

Fourth Embodiment

The following describes the image scaling method in this embodiment, supposing that the aspect ratio of the source image is 4:3 and that the aspect ratio of the target image is 16:9.

To detect the source image and determine that the main objects in the source image are distributed vertically, the following operations are performed.

Figure 4:
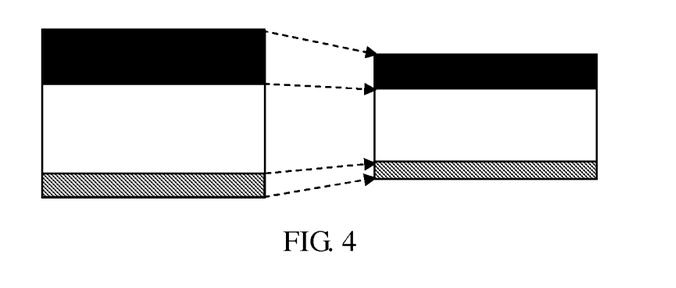
FIG. 4 shows segmenting of a source image and a target image in an image scaling method provided in a fourth embodiment of the present invention.

Step 41: As shown in FIG. 4, divide the source image into an upper segment, a middle segment, and a lower segment. It is assumed that the width of the source image is W and that the height of the source image is H. The source image is divided into an upper segment $R_1$, a middle segment $R_2$, and a lower segment $R_3$, and the heights of the segments are $H_1$, $H_2$ and $H_3$ respectively, where $H_1+H_2+H_3=H$. After scaling, the width of the target image is the same as the width of the source target, and the height of the target image is H'. Accordingly, the target image is divided into three segments, namely, an upper segment $R'_1$, a middle segment $R'_2$, and a lower segment $R'_3$, and their heights are $H'_1$, $H'_2$ and $H'_3$ respectively, where $H'_1+H'_2+H'_3=H'$.

Step 42: Perform scaling for each segment in the source image. A reverse mapping method is applied here. One or more source pixels corresponding to a target pixel of the target image are found in the source image, and the coordinate position and the value of the target pixel are determined in the target image according to the coordinate position and the value of the source pixels.

It is assumed that the coordinates of the source image pixel I are (x, y), and that the coordinates of the target image pixel I' are (x', y'). According to the 2-dimensional image scaling transformation theory, the following formula (1) applies:

$$\begin{bmatrix} x' \\ y' \\ 1 \end{bmatrix} = \begin{bmatrix} S_x & 0 & 0 \\ 0 & S_y & 0 \\ 0 & 0 & 1 \end{bmatrix} \begin{bmatrix} x \\ y \\ 1 \end{bmatrix} \quad (1)$$

where $S_x$ is a scaling factor of transformation from the source image to the target image in the horizontal direction, and $S_y$ is the scaling factor in the vertical direction.

The reverse mapping relation from the target image to the source image is (2):

$$\begin{bmatrix} x \\ y \\ 1 \end{bmatrix} = \begin{bmatrix} 1/S_x & 0 & 0 \\ 0 & 1/S_y & 0 \\ 0 & 0 & 1 \end{bmatrix} \begin{bmatrix} x' \\ y' \\ 1 \end{bmatrix} \quad (2)$$

In this embodiment, the reverse mapping relation in formula (2) can be used to deduce the transformation relations in formulas (3)-(5):

For I,I'∈R₁, the following formula applies:

$$\begin{bmatrix} x \\ y \\ 1 \end{bmatrix} = \begin{bmatrix} 1 & 0 & 0 \\ 0 & H_1/H'_1 & 0 \\ 0 & 0 & 1 \end{bmatrix} \begin{bmatrix} x' \\ y' \\ 1 \end{bmatrix} \quad (3)$$

For I,I'∈R₂, the following formula applies:

$$\begin{bmatrix} x \\ y \\ 1 \end{bmatrix} = \begin{bmatrix} 1 & 0 & 0 \\ 0 & H_2/H'_2 & 0 \\ 0 & 0 & 1 \end{bmatrix} \begin{bmatrix} x' \\ y' \\ 1 \end{bmatrix} \quad (4)$$

For I,I'∈R₃, the following formula applies:

$$\begin{bmatrix} x \\ y \\ 1 \end{bmatrix} = \begin{bmatrix} 1 & 0 & 0 \\ 0 & H_3/H'_3 & 0 \\ 0 & 0 & 1 \end{bmatrix} \begin{bmatrix} x' \\ y' \\ 1 \end{bmatrix} \quad (5)$$

Through formulas (3)-(5) above, the source pixels corresponding to the target pixel of the target image can be determined in the source image, the coordinate positions of the corresponding source pixels are obtained, and the valid image data corresponding to the target image is determined in the source image.

Figure 5:
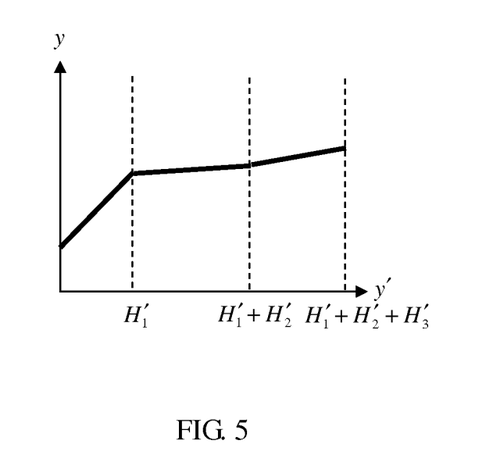
FIG. 5 shows transformation relations of pixel positions at different heights of a source image and a target image in the fourth embodiment of the present invention.

FIG. 5 shows transformation relations of pixel positions on different heights of a source image and a target image. As shown in FIG. 5, the pixels in the same segment are scaled linearly, and the scaling factor varies between segments. Therefore, the entire image is scaled nonlinearly. In the foregoing example, the transformation relation takes on a fold line; if every pixel is regarded as a segment and a scaling factor is specified for it, the transformation relation takes on a continuous curve.

Step 43: Perform data transformation for the target image after transformation. For example, perform filtering or average smoothing for the target image.

In the transformation, the pixel position mapped from the target image to the source image is generally not an integer, but a fraction. Therefore, the target image needs to be processed through an interpolation filtering algorithm, for example, a bilinear interpolation algorithm or a cubic convolution algorithm. The following description takes the bilinear interpolation algorithm as an example. First, the linear interpolation algorithm is introduced below. Values of four neighboring points around an origin are interpolated linearly in two directions to obtain values of the points to be sampled. That is, the corresponding weight is determined according to the distance between the point to be sampled and the neighboring point, and the value of the point to be sampled is calculated out. A fractional mapping position may be divided into an integer part and a decimal part that falls within [0,1), supposing that i, j are the integer part of the pixel, and that u, v are the decimal part, where u, v∈[0,1). Therefore, the value of the pixel f(i+u, j+v) can be determined according to four neighboring pixels around through this formula:

$$f(i+u,j+v)=(1-u)(1-v)f(i,j)+(1-u)vf(i,j+1)+u(1-v)f(i+1,j)+uvf(i+1,j+1) \quad (6)$$

To obtain better processing effects, the interpolation may be based on a cubic convolution algorithm, which is an improvement of the bilinear interpolation algorithm. It allows for not only the impact caused by the grayscale values of the four neighboring points, but also the impact caused by the change rate of the grayscale value between the neighboring points, and uses pixel values in wider neighboring areas around the point to be sampled to perform three interpolations. Its principles are the same as the principles of the prior art, and are not further described here.

Figure 6A:
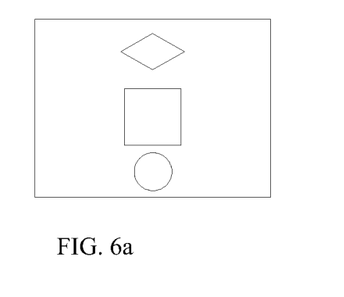
FIG. 6a shows a source image and FIG. 6b shows a target image after scaling.
Figure 6B:
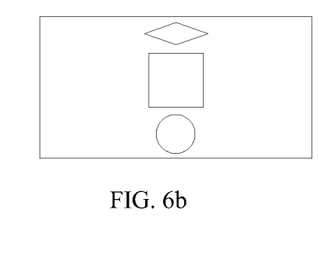

FIG. 6a shows a source image with an aspect ratio of 4:3, and FIG. 6b shows a target image after the source image is scaled vertically through an asymmetrical nonlinear scaling method provided herein. In FIG. 6a, the main objects of the image are distributed in the middle part and the lower part of the image, as indicated by the rectangle and the circle in FIG. 6a. In the image scaling process, a cubic convolution algorithm is applied as an interpolation algorithm. Because the main objects of the source image are centralized in the middle part and the lower part of the image and distributed horizontally, the scaling factor of the upper part is larger, and the scaling factor of the middle part and the lower part is very small and approaches 1. The comparison between FIG. 6a and FIG. 6b shows that in the scaled image, the main objects are scarcely distorted in the middle part and the lower part, to which the human eyes are sensitive, and that the trivial objects in the upper part are distorted greatly.

The principles of scaling an image with an aspect ratio of 16:9 to an image with an aspect ratio of 4:3 are the same as the principles described in the fourth embodiment. The difference is that the aspect ratio of the source image is 16:9, and the aspect ratio of the target image is 4:3.

In the image scaling method in the fourth embodiment, the distribution of the main objects in the image is taken into account, and the segments of the source image and the corresponding scaling factor are determined according to the distribution of main objects in the image. Therefore, the method avoids distortion of the target image in the area of the main objects, reduces the distortion caused in the scaling process, and brings a good visual effect.

Fifth Embodiment

Figure 7:
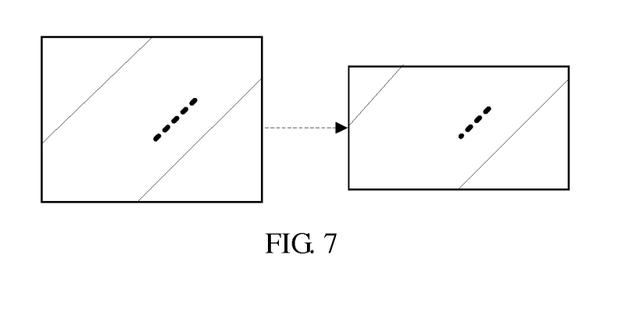
FIG. 7 shows segmenting of a source image and a target image in an image scaling method provided in a fifth embodiment of the present invention.

As shown in FIG. 7, it is assumed that the main objects in the source image take on a 45° angle to the horizontal, and the scaling direction of the nonlinear scaling method takes on a 135° angle to the horizontal. The fifth embodiment includes the following steps.

Step 51: Divide the source image into an upper segment, a middle segment, and a lower segment at an angle of 45° to the horizontal, supposing that the three segments of the source image from the upper left side to the lower right side are $R1_1$, $R1_2$, and $R1_3$ respectively. Accordingly, divide the target image into three segments at an angle of 45° to the horizontal, supposing that the three segments from the upper left side to the lower right side are $R1'_1$, $R1'_2$, and $R1'_3$ respectively.

Step 52: Perform scaling for each segment in the source image. A reverse mapping method may be applied here. One or more source pixels corresponding to a target pixel of the target image are found in the source image, and the coordinate position and the value of the target pixel are determined in the target image according to the coordinate position and the value of the source pixels. This step may be based on the method described in the fourth embodiment above.

Step 53: Perform data transformation for the target image after transformation. For example, perform filtering or average smoothing for the target image. Similarly to the fourth embodiment, in the transformation, the pixel position mapped from the target image to the source image is generally not an integer, but a fraction. Therefore, the target image needs to be processed through an interpolation filtering algorithm, for example, a bilinear interpolation algorithm or a cubic convolution algorithm.

Through the image scaling method in the fifth embodiment, the distribution direction of the main objects in the source image is determined through detection of the image content, and the source image is scaled to the target image through a proper nonlinear scaling method according to the distribution direction of the main objects in the source image. Therefore, the method provided in this embodiment avoids distortion of the target image in the important area to which human eyes are sensitive, and reduces the distortion of the scaled image.

Sixth Embodiment

An image scaling apparatus is provided in this embodiment.

Figure 8:
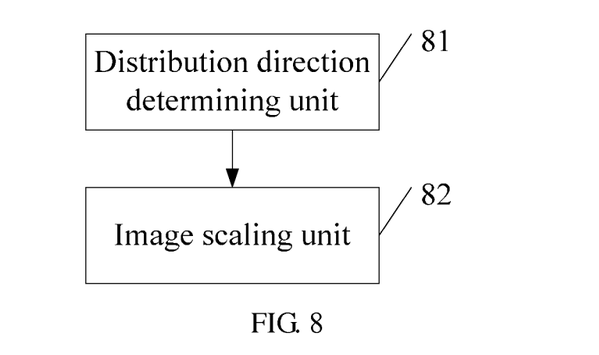
FIG. 8 shows an image scaling apparatus provided in a sixth embodiment of the present invention.

As shown in FIG. 8, the image scaling apparatus in the sixth embodiment includes a distribution direction determining unit 81 and an image scaling unit 82.

The distribution direction determining unit 81 is adapted to determine a distribution direction of main objects in a source image; and the image scaling unit 82 is adapted to scale the source image to a target image through a nonlinear scaling method according to the distribution direction of the main objects in the source image, where the nonlinear scaling method employs a scaling direction vertical to the distribution direction of the main objects in the source image.

Figure 9:
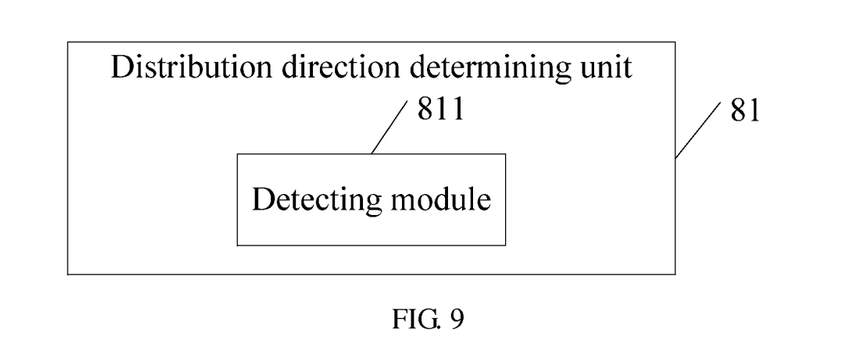
FIG. 9 shows a structure of a distribution direction determining unit in the image scaling apparatus provided in the sixth embodiment of the present invention.

The distribution direction determining unit 81 may determine the distribution direction of main objects in the source image in different modes. As shown in FIG. 9, the distribution direction determining unit 81 may include a detecting module 811, which is adapted to detect the source image and determine the distribution direction of the main objects in the source image.

Depending on the result of the distribution direction determining unit 81, the image scaling unit 82 may apply different scaling methods. For example, when the main objects in the image are distributed vertically, the image scaling unit 82 applies a horizontal nonlinear scaling method in the prior art. When the main objects in the image are distributed horizontally, the image scaling unit 82 applies a vertical nonlinear scaling method. Any scaling method is appropriate as long as the scaling direction of the image is vertical to the distribution direction of the main objects.

Figure 10:
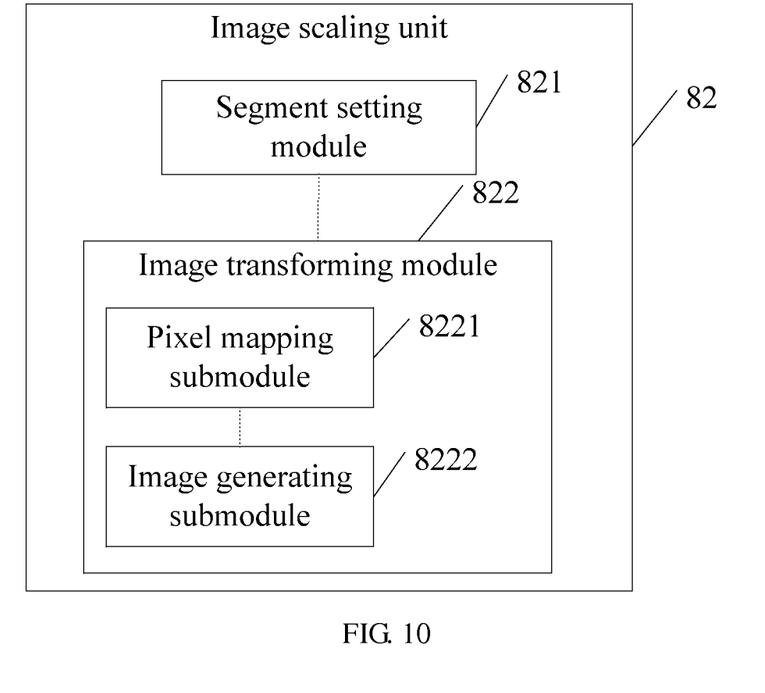
FIG. 10 shows a structure of an image scaling unit in the image scaling apparatus provided in the sixth embodiment of the present invention.

As shown in FIG. 10, the image scaling unit 82 includes a segment setting module 821, adapted to divide the source image into at least two segments vertically, and set a different scaling factor for each segment; and an image transforming module 822, adapted to transform pixels in each segment of the source image into the target image at the corresponding scaling factor.

As shown in FIG. 10, the image transforming module 822 includes a pixel mapping submodule 8221, adapted to query a segment of the source image for at least one source pixel corresponding to each target pixel in each corresponding segment of the target image; and an image generating submodule 8222, adapted to determine coordinate positions and values of the target pixels in the target image according to the coordinate positions and values of the source pixels.

Through the image scaling apparatus in the sixth embodiment, the distribution direction of the main objects in the source image is determined through detection of the image content, and the source image is scaled to the target image through a proper nonlinear scaling method according to the distribution direction of the main objects in the source image. Therefore, the apparatus provided in this embodiment avoids distortion of the target image in the important area to which human eyes are sensitive, and reduces the distortion of the scaled image.

Seventh Embodiment

To improve efficiency and accuracy of image scaling, on the basis of the image scaling apparatus shown in FIG. 9 and FIG. 10, the segment setting module 821 is further adapted to divide the target image into at least two segments corresponding to the source image. Similarly to the method embodiment described above, at the time of segmenting the source image, the width and the height of the target image may be calculated out according to the source image. The target image can be segmented in the same way as segmenting the source image.

The apparatus provided in the seventh embodiment avoids distortion of the target image in the important area to which human eyes are sensitive, reduces the distortion of the scaled image, and improves efficiency and accuracy of image scaling.

In conclusion, through the image scaling method and apparatus in the embodiments of the present invention, the distribution direction of the main objects in the source image is determined through detection of the image content, and the source image is scaled to the target image through a proper nonlinear scaling method according to the distribution direction of the main objects in the source image. Therefore, the method and apparatus under the present invention prevent distortion of the target image in the important area to which human eyes are sensitive, and reduce the distortion of the scaled image.

After reading the foregoing embodiments, those skilled in the art are clearly aware that the present invention may be implemented through hardware, or through software in addition to a necessary universal hardware platform. The technical solution under the present invention may be embodied in a software product. The software product may be stored in a nonvolatile storage medium (such as a Compact Disk-Read Only Memory (CD-ROM), a Universal Serial Bus (USB) flash disk, or a mobile hard disk), and may incorporate several instructions that enable a computer device (such as a personal computer, a server, or a network device) to perform the methods provided in any embodiment of the present invention.

The above descriptions are merely exemplary embodiments of the present invention, but not intended to limit the scope of the present invention. Any modifications, variations or replacements that can be easily derived by those skilled in the art should fall within the scope of the present invention. Therefore, the scope of the present invention is subject to the appended claims.

What is claimed is:

1. An image scaling method, comprising:
   determining a distribution direction of main objects comprising persons, faces of persons or areas of rich textures in a source image through detection of the source image;
   scaling the source image to a target image through a nonlinear scaling method according to the distribution direction of the main objects in the source image, wherein the nonlinear scaling method employs a scaling direction perpendicular to the distribution direction of the main objects in the source image,
   wherein the distribution direction is one of horizontal and vertical;
   wherein determining the distribution direction and scaling the source image are performed in a computer device; and wherein the determining the distribution direction of the main objects comprises:

detecting the source image through face detection method, edge detection method, or entropy coding method;

if the face detection method is performed, detecting the distribution of the faces of persons in the source image, obtaining the distribution direction of the main objects through the distribution direction of the persons and the symmetry information;

if the edge detection method is performed, calculating the edge distribution of the source image, identifying the areas of rich textures in the source image, determining the distribution direction of the main objects; and if the entropy coding method is performed, detecting the direction with even distribution of the main objects in the source image, and determining the distribution of the main objects in the source image.

2. The image scaling method according to claim 1, wherein, if the distribution direction of the main objects in the source image is determined as horizontal, the step of scaling the source image to the target image through the nonlinear scaling method according to the distribution direction of the main objects in the source image comprises:

dividing the source image into at least two segments vertically;

setting a different scaling factor for each segment in the source image; and transforming pixels in each segment of the source image into the target image at a corresponding scaling factor.

3. The image scaling method according to claim 2, wherein, after dividing the source image into at least two segments vertically, the method further comprises dividing the target image into at least two segments corresponding to the source image.

4. The image scaling method according to claim 2, wherein setting a different scaling factor for each segment in the source image comprises setting a scaling factor for each segment of the main objects and each segment of trivial objects respectively in the source image.

5. The image scaling method according to claim 2, wherein transforming the pixels in each segment of the source image into the target image at the corresponding scaling factor comprises:

querying a segment of the source image for at least one source pixel corresponding to each target pixel in each corresponding segment of the target image; and determining coordinate positions and values of target pixels in the target image according to coordinate positions and values of the source pixels.

6. A non-transitory computer-readable storage medium with an executable program stored thereon, wherein the program instructs a computer device to perform the following steps:

determining a distribution direction of main objects comprising persons, faces of persons or areas of rich textures in a source image through detection of the source image; and scaling the source image to a target image through a nonlinear scaling method according to the distribution direction of the main objects in the source image, wherein the nonlinear scaling method employs a scaling direction perpendicular to the distribution direction of the main objects in the source image;

wherein the distribution direction is one of horizontal and vertical;

wherein the determining the distribution direction of the main objects comprises:

detecting the source image through face detection method, edge detection method, or entropy coding method;

if the face detection method is performed, detecting the distribution of the faces of persons in the image, obtaining the distribution direction of the main objects through the distribution direction of the persons and the symmetry information;

if the edge detection method is performed, calculating the edge distribution of the source image, identifying the areas of rich textures in the source image, determining the distribution direction of the main objects; and if the entropy coding method is performed, detecting the direction with even distribution of the main objects in the source image, and determining the distribution of the main objects in the source image.

7. The computer-readable storage medium of claim 6, wherein, if the distribution direction of the main objects in the source image is determined as horizontal, the step of scaling the source image comprises:

dividing the source image into at least two segments vertically;

setting a different scaling factor for each segment in the source image; and transforming pixels in each segment of the source image into the target image at a corresponding scaling factor.

8. The computer-readable storage medium of claim 7, wherein, after dividing the source image into at least two segments vertically, the program further instructs the computer device to divide the target image into at least two segments corresponding to the source image.

9. The computer-readable storage medium of claim 7, wherein the step of setting a different scaling factor for each segment in the source image comprises setting a scaling factor for each segment of the main objects and each segment of trivial objects respectively in the source image.

10. The computer-readable storage medium of claim 7, wherein the step of transforming the pixels in each segment of the source image into the target image at the corresponding scaling factor comprises:

querying a segment of the source image for at least one source pixel corresponding to each target pixel in each corresponding segment of the target image; and determining coordinate positions and values of target pixels in the target image according to coordinate positions and values of the source pixels.

* * * * *